Oct. 20, 1964  S. ERICSSON ETAL  3,153,619
ARRANGEMENT FOR LONG-STANDING STORAGE OF DAMAGED
ACTIVE FUEL ELEMENTS OF A NUCLEAR REACTOR
Filed Dec. 29, 1960  2 Sheets-Sheet 2
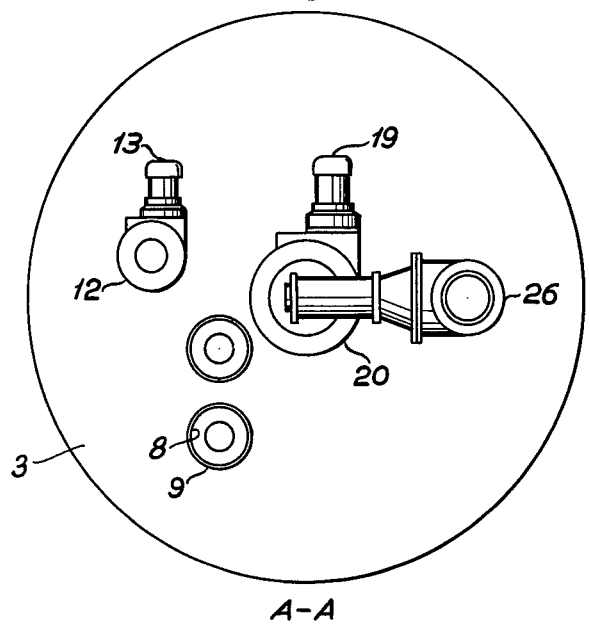
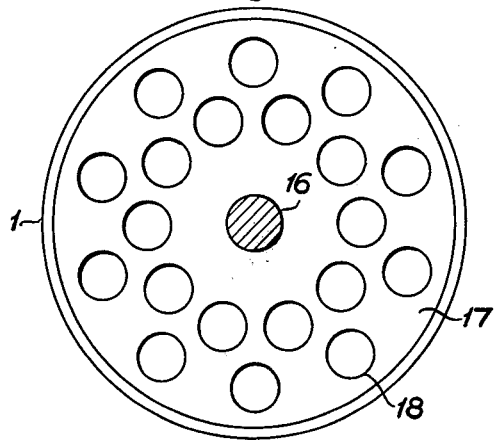
INVENTOR
Stig Ericsson, Bengt Nilsson
Sven-Otto Brunzell
BY
Bailey, Stephens & Huettig
Attorneys United States Patent Office 3,153,619
Patented Oct. 20, 1964

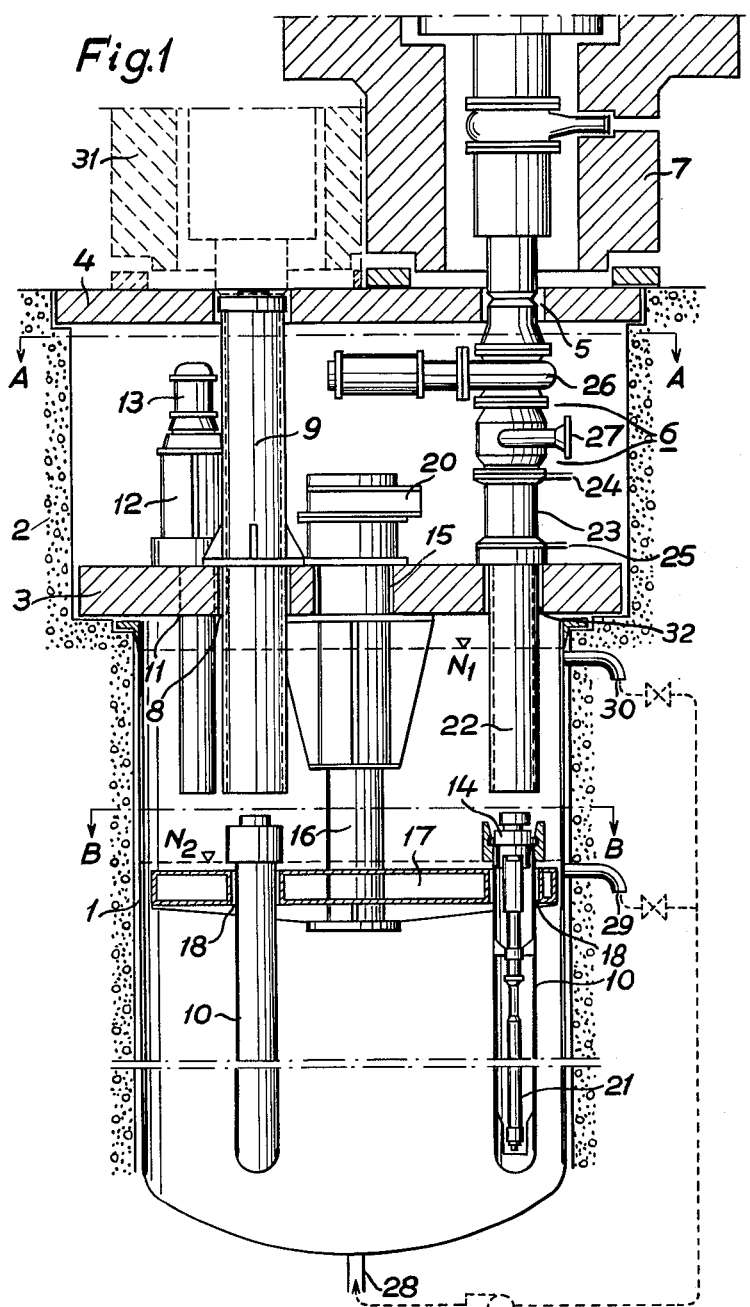

3,153,619
ARRANGEMENT FOR LONG-STANDING STORAGE OF DAMAGED ACTIVE FUEL ELEMENTS OF A NUCLEAR REACTOR
Stig Ericsson, Bengt Nilsson, and Sven-Otto Brunzell, Vasteras, Sweden, assignors to Allmanna Svenska Elektriska Aktiebolaget, Vasteras, Sweden, a Swedish corporation
Filed Dec. 29, 1960, Ser. No. 79,283
Claims priority, application Sweden, Dec. 31, 1959, 12,345/59
2 Claims. (Cl. 176—30)

Fuel elements with damages to the can or the like have to be stored in special water filled storage pots long enough for their radioactivity to decrease to a certain extent. The principal feature of the present invention is to store irradiated fuel elements with damages to the can or the like in special water filled sealed bottle-shaped storage vessels inserted in a water filled storage container long enough to decrease the radioactivity of the fuel elements to an appropriate extent. When a warm element is inserted in a bottle from a reactor fuel element charging machine it is essential to prevent the steam generated in the storage pot from reaching the machine where it may condense on the walls and, during the next change of fuel, contaminate the reactor and impair its nuclear qualities.

The invention relates to an arrangement for long-standing storage of damaged active fuel elements of a nuclear reactor, comprising an inlet assembly for said elements and is characterised in that the arrangement comprises a revolving disc with openings to carry bottles arranged in at least one, preferably two, circles concentric with the centre of rotation of the disc, and devices for mechanical application and removal of covers on and from said bottles and that the inlet assembly is provided with a sealing device arranged to prevent steam passage from the storage container. An emergency cooling system is arranged to be used in the event of a fuel element, when inserted, being jammed in the bottle.

One embodiment of the invention will now be particularly described with reference to the accompanying drawings where FIGURE 1 is a vertical section through a storage container showing the details necessary for the understanding of the invention and part of the fuel element charging machine. FIGURE 2 is a horizontal section through the line A—A in FIGURE 1 and FIGURE 3 is a horizontal section through the line B—B in FIGURE 1.

The storage container 1 is inserted in a storage well 2 and closed by a sealing ray shield cover 3. The upper part of the well 2 is closed by a cover 4 which has an opening 5 for an inlet assembly or fuel element transferring means indicated generally at 6 which cooperates with a fuel element charging machine 7. The ray-shield cover 3 is provided with two openings 8 for pipes through which bottle shaped storage means 10, hereinafter referred to as bottles, can be moved either by the fuel element charging machine or, as indicated in dotted lines, by a separate assembly 31. The cover 3 has, besides these openings, an opening 11 for a device 12 with a motor 13 for mechanical removal and application of the plugs 14 of the bottles 10 and an opening 15 for a shaft 16 carrying a disc 17. The disc is intended to carry the bottles 10 and is therefore provided with a number of openings 18 arranged in two circles concentric with the centre of rotation of the disc, these two circles passing respectively through the centres of the openings 8. The purpose of this arrangement is to enable the storage of a great number of bottles containing damaged irradiated fuel elements. When the outer circle is filled with bottles, they can be removed to the inner circle by lifting them through one pipe 9 and lowering them through the other pipe 9. The disc is carried by the shaft 16 and can be revolved by the motor 19 via a gear 20. Every bottle has, as mentioned, a cover 14.

When a damaged fuel element 21 is to be inserted the water level of the container 1 is lowered from the level $N_1$ to the level $N_2$. The disc 17 is revolved in order to bring the empty bottle 10 in the outer circle under the plug removing device 12. The device, of any known construction, removes the cover and keeps it in an elevated position.

By revolving the disc the bottle is now brought under an axially movable inlet pipe 22 which forms a part of the above mentioned fuel element passing means 6, and which passes through an opening 32 in the cover 3. The inlet pipe 22 is attached to the piston of a double-acting pressure fluid operated cylinder 23 which is provided with pipe connections 24 and 25 for the supply of pressure fluid to, and its exhausting from, the cylinder. By means of the cylinder 23 the pipe 22 is pressed into sealing engagement with the opening of the bottle. A slide valve 26 of the inlet assembly 6, which has been closed up until now, is opened leaving the way free for a damaged fuel element to pass from the fuel element charging machine 7 to the bottle. When the element has been inserted in the bottle the valve 26 is closed and the bottle is supplied with water through the pipe 27 of the inlet assembly. Said pipe can also be used for the supply of emergency cooling water in the event of a fuel element, when inserted, being jammed in the bottle. When the bottle has been filled with water the working cylinder 23 lifts the inlet pipe 22. By turning the disc the bottle is brought back under the plug removing device 12 which applies the plug on the pot. The water level is raised to its previous level $N_1$. The pump system for coolant circulation is connected to the pipes 28, 29 and 30 and can be combined with the emergency cooling system.

Either the fuel element charging machine or a separate assembly 31 shown schematically in dotted lines in FIGURE 1 can be connected to the pipes 9 through which the bottles are removed from the outer circle to the inner circle of the disc 17.

What we claim is:
1. Means for long term storage of irradiated fuel elements from nuclear reactors comprising means forming a well, a storage container inserted in the lower part of the well and adapted to be filled with water at substantially two different levels, a cover closing the well and the container and a radiation protective cover closing the well, said covers having aligned openings therein, a disc within the container, means mounting the disc for rotation about a vertical axis, said disc having openings located in a circle concentric with said axis, cylindrical storage means for fuel elements arranged in said openings, removable plugs for closing said storage means for preventing fission products therein from contaminating water in the storage container, means for removing said plugs from storage means held by said disc, retaining them in elevated position and re-inserting them into said storage means, means forming a passage from the reactor to the container, means for transferring fuel elements from said reactor to said container through said passage and inserting them into said storage means, said fuel element transferring means comprising an axially movable pipe means mounted to be lowered into scaling engagement with the upper end of a storage means held by said disc, a hydraulically operated means for moving said pipe means vertically, means for supplying water to the storage means and the container, and valve means in the passage for opening and closing it for preventing steam generated by the fuel element from passing to the fuel element transferring means.

2. In means according to claim 1, a pump system for circulating the cooling water through the storage container.

References Cited in the file of this patent

UNITED STATES PATENTS

| | | |
|---|---|---|
| 2,725,993 | Smith | Dec. 6, 1955 |
| 2,851,410 | Vernon | Sept. 9, 1958 |
| 2,983,659 | Treshow | May 9, 1961 |

FOREIGN PATENTS

| | | |
|---|---|---|
| 229,502 | Australia | July 20, 1960 |
| 564,440 | Belguim | Feb. 15, 1958 |

OTHER REFERENCES

Nucleonics, vol. 14, No. 10, October 1956, page 85.